Dec. 20, 1960    R. L. JAYCOX ET AL    2,965,846
PERCENTAGE PULSING CIRCUIT
Filed June 2, 1958    2 Sheets-Sheet 1

INVENTORS
RICHARD L. JAYCOX
NORTON S. MOST
BY Moody and Goldman
ATTORNEYS

Dec. 20, 1960 R. L. JAYCOX ET AL 2,965,846
PERCENTAGE PULSING CIRCUIT
Filed June 2, 1958 2 Sheets-Sheet 2

INVENTORS
RICHARD L. JAYCOX
NORTON S. MOST
BY Moody and Goldman
ATTORNEYS

United States Patent Office 2,965,846
Patented Dec. 20, 1960

2,965,846

PERCENTAGE PULSING CIRCUIT

Richard L. Jaycox and Norton S. Most, Cedar Rapids, Iowa, assignors to Collins Radio Company, Cedar Rapids, Iowa, a corporation of Iowa Filed June 2, 1958, Ser. No. 739,370

5 Claims. (Cl. 328—41)

This invention relates to a device for testing a characteristic of a type of radar which receives back only a percentage of its transmitted pulses.

One such type of radar is a distance-measuring portion of an airborne tacan transmitter, which transmits interrogation pulses to a ground station. A transponder at the ground station transmits back reply pulses for only a part of the received interrogation pulses. The reason why the ground station does not respond to all interrogation pulses is because it generates other types of pulses which are given a higher priority. For example, bearing information, such as north and auxiliary bearing pulses, originating at the transmitter are given priority. Thus, whenever an interrogation pulse is received while a bearing pulse is being transmitted, or during a "dead time" of about 60 microseconds immediately following a bearing pulse, no reply pulse is transmitted. Once the transmitter begins a reply to one aircraft, interrogation pulses from other aircraft occurring during the reply pulse and its following "dead time" are not replied to.

When a single aircraft is providing interrogation pulses, it can expect to receive a reply to only about 85 percent of its interrogation pulses. On the other hand, where there are around one-hundred interrogating aircraft in a vicinity, any single aircraft can only expect to receive replies to about 50 percent of its interrogation pulses.

Accordingly, a tacan airborne receiver must be able to operate with a reply-pulse efficiency that may vary between about 85 and 50 percent.

This invention provides a test circuit for deleting various percentages of pulses to simulate the deletion of reply pulses and enable a determination of the operating characteristics of a tacan airborne receiver.

It is therefore a primary object of this invention to provide a pulse deleting circuit that controls the percent of deleted pulses in any of several specified amounts.

The invention includes a pair of gates alternately enabled by opposite outputs from a control-trigger circuit. An output of one gate is provided to the input of a one-shot or bistable trigger circuit. A switch is connected to a conversion input of the trigger circuit to determine whether it operates as a one-shot multivibrator or as a bistable circuit. When connected as a bistable circuit, it acts as a binary divider of received pulses from the amplifier. On the other hand, when connected as a one-shot, it does not provide any divider action but merely acts as an amplifier of received pulses.

Any number of trigger circuits, or none, may be connected in tandem to a differentiated output of the first trigger circuit. The output of the last one is connected to an input of the control-trigger circuit, wherein a pulse received at this input reverses the enablement states of the gates. The output of the other amplifier is also received by an input of the control-trigger circuit. Consequently, the next pulse passes through the enabled gate to reverse the state of the control-trigger circuit and again enable the first gate to pass pulses to the first trigger circuit.

Further objects, features and advantages will be apparent to a person skilled in the art upon further study of the specification and the accompanying drawings, in which.

Figure 1:
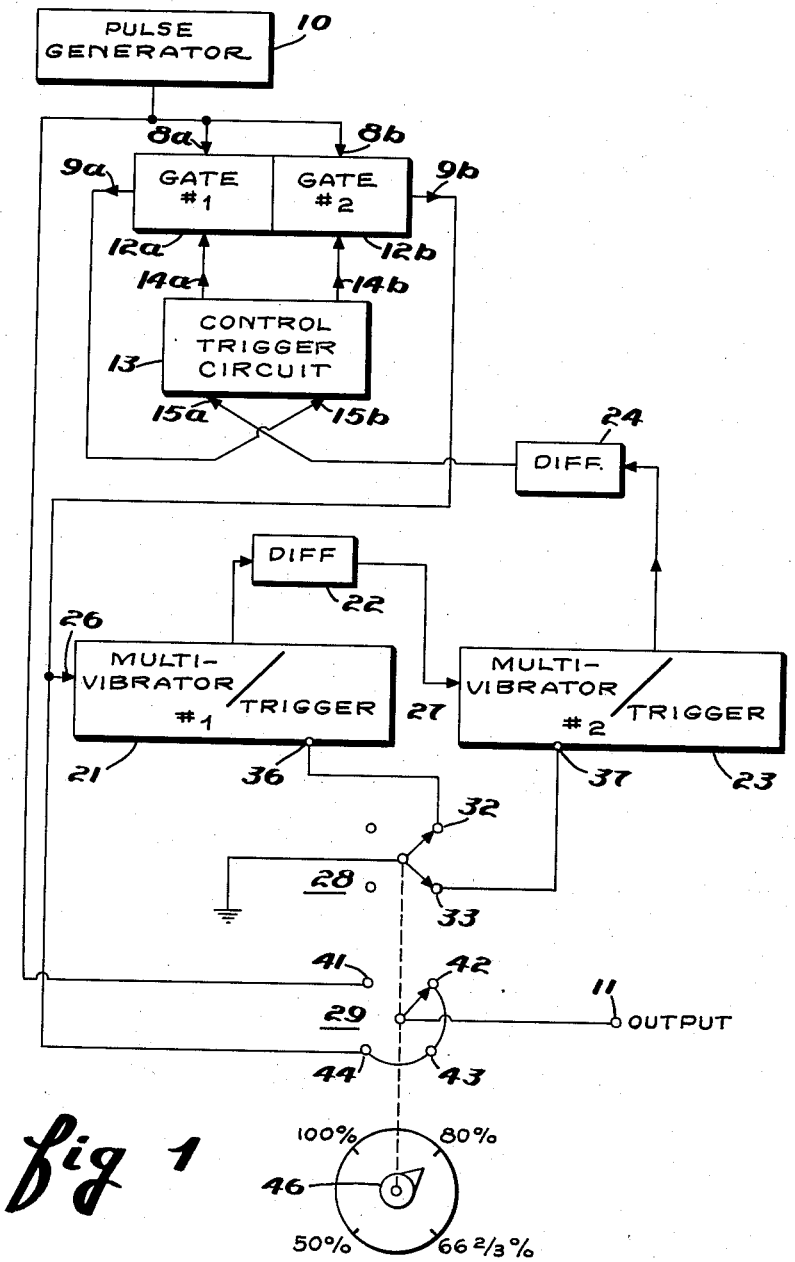
Figure 1 is a block representation of the invention.

The drawings are now considered for a more detailed explanation of a preferred embodiment of the invention. A pulse generator 10 is provided which generates pulses simulating interrogation pulses. They may be obtained directly from the transmitter portion of an airborne tacan transceiver.

The output of generator 10 is received by respective inputs 8a and 8b of a pair of gates 12a and 12b. The gates are alternately enabled by the opposite outputs 14a and 14b of a control bistable trigger circuit 13. Gates 12a and 12b and bistable circuit 13 may be of conventional design. Conventional amplifiers can be used as gates 12a and b; and the outputs of circuit 13 may be connected for example to their respective grids so that one amplifier is always biased below cutoff. The second gate 12b is normally enabled in the operation of the invention to pass pulses to its output 9b.

A one-shot or bistable trigger circuit 21 has its input 26 connected to gate output 9b. Circuit 21 has a conversion input 36 connected to a contact 32 of a switch 28, that has a double pole connected to ground. When conversion input 36 is connected to ground by switch 28, circuit 21 operates as a bistable circuit. On the other hand, when terminal 36 is not connected to ground through switch 28, circuit 21 operates as a one-shot multivibrator.

A differentiating circuit 22 receives the output of circuit 21 as a short duty cycle pulse. Thus, when circuit 21 is connected as a one-shot, the output of differentiating circuit 22 provides the same number of pulses as is received by circuit 21. On the other hand, when circuit 21 is connected as a bistable circuit, differentiating circuit 22 provides one output pulse for every two received by circuit 21, and is a binary-pulse divider.

Figure 2:
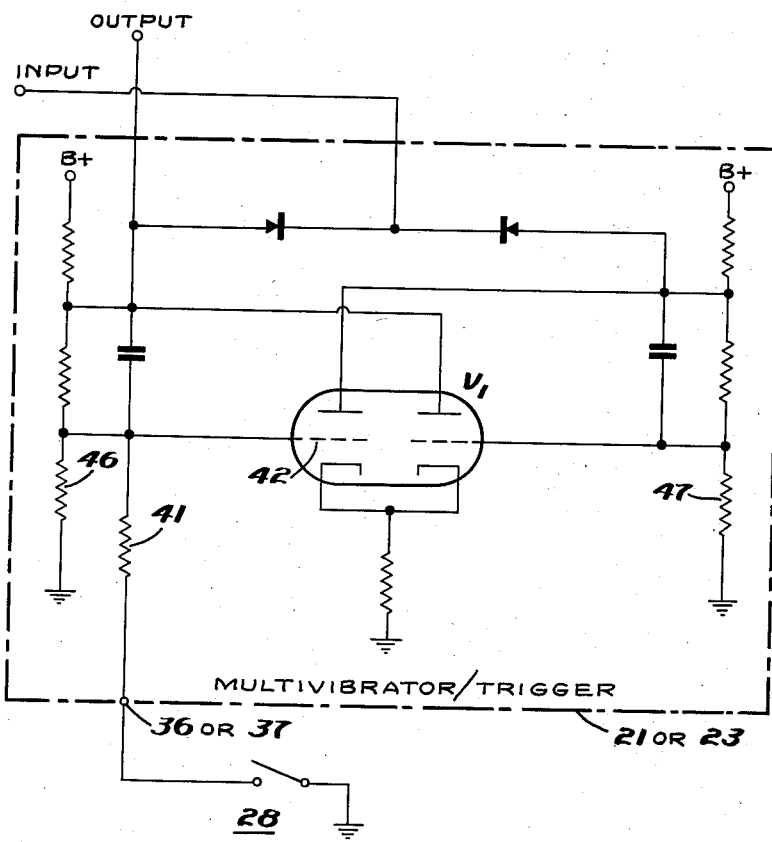
Figure 2 is a schematic of a block component found in Figure 1.

The conversion of circuit 21 by the grounding or ungrounding of its input 36 is obtained by altering the component balance between both sides of an otherwise conventional trigger circuit. Thus, when both sides of the circuit are balanced, bistable operation is provided. On the other hand, when one side of the circuit has its component values unbalanced, operation is provided. Figure 2 shows one type of such a circuit and will be referred to in more detail below.

A second trigger circuit 23, which is the same as circuit 21, has its input connected to the output of differentiating circuit 22. Likewise, circuit 23 has a conversion input 37 which is connected to another contact 33 of switch 28. A differentiating circuit 24 is connected between the output of circuit 23 and a setting input 15a of control-trigger circuit 13.

Whenever a pulse is received by input 15a, trigger circuit 13 reverses its output state to disable gate 12b and enable gate 12a. Thus, the very next pulse from generator 10 cannot pass through gate 12b. But the pulse passes through gate 12a and its output 9a to a resetting input 15b of control-trigger circuit 13 to again reverse its output state, which enables gate 12b and disables gate 12a. Hence, trigger control of the gates permits at any one time only one pulse from generator 10 to be blocked by gate 12b and to be passed by gate 12a.

The number of pulses passing through gate 12b between blocked pulses is dependent upon the pulse-divider action of the chain of trigger circuits.

Thus, as shown in Figure 1, both of the conversion inputs of circuits 21 and 23 are grounded by switch 28. Thus, circuits 21 and 23 both act as binary divider circuits. Thus, for every four input pulses provided from generator 10 through amplifier 12b, there is provided a single output pulse from differentiator 24 to input 15a of trigger circuit 13 to reverse the operating states of the gates for one pulse period. Thus, after four pulses are passed by gate 12b, the fifth pulse is blocked by it but passes through gate 12a to retrigger gate 12b open. Hence, the next four pulses pass through gate 12b and the fifth is again blocked, etc. Thus, one out of five pulses is blocked by gate 12b with the position of switch 28 illustrated in Figure 1, which permits gate 12b to pass 80 percent of the pulses received from generator 10.

The output of the invention is provided at terminal 11 which is connected to a pole of a switch 29. A contact 41 of switch 29 is connected directly to the output of generator 10 to pass pulses without deletion. Other contacts 42, 43 and 44 of switch 29 are connected together to the output 9b of gate 12b. The poles of switches 28 and 29 are mechanically coupled to a knob 46, which may be calibrated in terms of the percentage of pulses received by terminal 11 from generator 10. Knob 46 is calibrated with 100 percent, 80 percent, 66⅔ percent, and 50 percent of the pulses provided by generator 10.

However, output 11 may be connected to circuitry (not shown or described) which simulates the reply-pulse generation of a tacan ground beacon. Such tacan transponder simulation would cause a further pulse deletion of about 15 percent. In such case the given calibrations of knob 46 are multiplied by 85 percent. That is, instead of having 100, 80, 66⅔, and 50 percent, they would be respectively replaced by about 85, 70, 55, and 45 percent.

Furthermore, time delay would also be provided to the pulses from the invention by means not shown to simulate varying range distances.

If switch 46 is turned to the position designated as 66⅔ percent, conversion input 36 is ungrounded, thus causing circuit 21 to act as a multivibrator. Hence, only the binary divider operation of circuit 23 remains, and a division by two results in the system. Consequently, a pulse is provided from differentiator 24 for every two pulses passed by gate 12b. As explained above, each pulse provided from differentiator 24 disables gate 12b for one pulse period to block one input pulse. Consequently, after every two pulses pass through gate 12b, a third is blocked, which enables an output-pulse efficiency of 66⅔ percent, as designated for this position of knob 46.

When knob 46 is at the 50 percent position, both of the conversion inputs 36 and 37 are ungrounded; and both circuits 21 and 23 act as one-shots to obtain no divider action, which is equivalent to a division by one. Under these conditions every time a pulse passes through gate 12b, it also passes through multivibrators 21 and 23 to trigger circuit 13 to reverse the states of the gates. Hence, for every pulse received, the next is blocked by gate 12b to provide a 50 percent output efficiency, as designated.

Figure 2 illustrates one type of circuit which may be used for each of trigger circuits 21 and 23. The circuit in Figure 2 is basically a conventional cathode-coupled trigger circuit. Therefore, Figure 2 is not described in detail. The resistors on both sides of the circuit in Figure 2 are balanced in resistive values to provide trigger circuit operation. Thus, the circuit in Figure 2 used a dual-triode tube $V_1$, one triode having a grid 42. The conversion feature added by this invention is a resistor 41 having a value, such that when it is grounded by switch 28, the paralleled resistance of resistors 41 and 46 equals resistor 47. When switch 28 does not ground this input, resistor 41 is not used and the circuit becomes unbalanced, because resistor 46 is much larger than resistor 47; then, circuit 21 acts as a one-shot. Thus, by merely closing or opening switch 28 in Figure 2, conversion is obtained between bistable circuit and one-shot circuit operation.

With some types of convention trigger circuits, a single input may be used for both input operations, rather than the dual inputs shown.

Although this invention has been described with respect to a particular embodiment thereof, it is not to be so limited as changes and modifications may be made therein which are within the full intended scope of the invention as defined by the appended claims.

We claim:
1. A circuit for passing a discrete percentage of input pulses, comprising first and second gates receiving said input pulses, a control-trigger circuit having opposite outputs connected respectively to enabling inputs of said gates, a setting input of said control-trigger circuit connected to an output of said first gate, a plurality of trigger circuits operating as either one-shot or bistable multivibrators connected in tandem between an output of said second gate and a resetting input to said control-trigger circuit, means for controlling each of said trigger circuits to operate as either a one-shot or as a binary divider, and the output of said second gate passing a discrete percentage of said input pulses determined by said means for controlling said trigger circuits.

2. A circuit for passing a discrete percentage of pulses, comprising first and second gates, each receiving said input pulses, a plurality of trigger circuits capable of operating as either one-shot or bistable multivibrators connected in tandem to an output of the second gate, each of said trigger circuits including a conversion input, means within each of said trigger circuits connected to its conversion input to obtain conversion between one-shot and binary divider operation, switching means being connected to each of said conversion inputs to selectively control the conversion states of the respective trigger circuits, a control-trigger circuit having opposite outputs respectively connected to said gates to alternately enable them, means connecting an output of said plurality of trigger circuits to a resetting input of said control-trigger circuit, and a setting input of said control trigger circuit being connected to the output of the first gate.

3. Means for passing a discrete percentage of pulses provided from a radar transmitter, comprising first and second gates, means connecting an input of each gate to the output of said transmitter, a control-trigger circuit having opposite outputs connected to said first and second gates to alternately enable them, said control-trigger circuit having setting and resetting inputs, the setting input being connected to an output of said first gate, a plurality of trigger circuits capable of operating as either one-shot or binary-divider circuits connected in tandem between the output of said second gate and the resetting input of said control-trigger circuit, first switching means for selectively setting said trigger circuits to operate as one-shot or binary divider circuits, second switching means having at least a single pole engaging a plurality of contacts, at least some of said contacts being connected to an output of said second gate, and an output of said circuit being connected to the pole of said second switching means.

4. Means for passing discrete percentages of input pulses, comprising first and second gates receiving said pulses, a control-trigger circuit having opposite outputs connected to said gates to alternately enable them, a setting input of said control-trigger circuit being connected to an output of the first gate, a first trigger circuit having its input connected to an output of said second gate, a second trigger circuit, each of said trigger circuits being operable either as a one-shot or a binary-divider circuit, a first differentiating circuit connecting an output of said first trigger circuit to an input of said second trigger circuit, a second differentiating circuit connecting an output of the second trigger circuit to a resetting input of said control-trigger circuit, switching means for selectively converting said bistable circuits between one-shot and divider operation, and a pulsed output having a discrete percentage of said input pulses being obtainable from an output of said second gate.

5. A circuit, as defined by claim 4 in which said switching means comprise, first and second switches coupled together, said first switch having a double pole and at least four contacts, said double pole being connected to ground, and two of said contacts respectively connected to said trigger circuits to convert their operation; the second switch having a single pole, and at least four contacts, with three contacts connected to the output of said second gate, and a fourth contact receiving said input pulses.

References Cited in the file of this patent

UNITED STATES PATENTS

| | | |
|---|---|---|
| 2,489,303 | Lyons | Nov. 29, 1949 |
| 2,644,887 | Wolfe | July 7, 1953 |